Nov. 10, 1970     H. SEIDEL     3,539,925
ALMOST-COHERENT PHASE DETECTION
Filed Feb. 28, 1968     2 Sheets-Sheet 1

INVENTOR
H. SEIDEL
BY
Sylvan Sherman
ATTORNEY

United States Patent Office 3,539,925
Patented Nov. 10, 1970

3,539,925
ALMOST-COHERENT PHASE DETECTION
Harold Seidel, Warren Township, Somerset County, N.J., assignor to Bell Telephone Laboratories, Incorporated, Murray Hill and Berkeley Heights, N.J., a corporation of New York
Filed Feb. 28, 1968, Ser. No. 709,130
Int. Cl. H04b 1/10; H03d 5/00; H04j 1/17
U.S. Cl. 325—65                               7 Claims

ABSTRACT OF THE DISCLOSURE

The advantages of coherent phase detection are realized by means of a phase diversity detection system which uses two phase detectors and an "almost-coherent" reference signal, nominally tuned to the frequency of the signal to be detected.

The input signal is divided into two components, each of which is coupled to a different one of the two detectors. Similarly, the reference signal, which is locally generated and not synchronized with the signal to be detected, is also coupled to the detectors. Phase diversity is realized by shifting the relative phase of either the input signals or the reference signals coupled to the two detectors such that either the two input signals or the two reference signals are 90 degrees out of time phase with respect to each other.

Means are described for combining the outputs from the two phase detectors to produce either a direct current or alternating current output signal. Also described is a highly secure communication system using almost-coherent phase detectors.

This application relates to narrow band signal detectors.

BACKGROUND OF THE INVENTION

The use of phase sensitive detectors to identify one signal component from among many other signal components, which are both closely spaced in frequency and of comparable, or even greater amplitude, is well known in the art. Typically, one seeks to detect a very weak signal in the presence of relative high-level noise. In a coherent, or synchronous phase detection system this is accomplished by means of a phase-coherent modulation and demodulation process wherein a common signal source is used in connection with both operations. At the transmitter, the common signal source is used to modulate the carrier signal. At the receiver, the common signal source provides a reference signal at the phase detector. Detection of the desired signal is accomplished by comparing the phase of all the signal conmponents with that of the reference signal which bears a fixed phase relationship with only the desired signal. Because of this unique relationship, an output signal is produced only when the desired signal is present. The other signal components, on the other hand, bear no special phase relationship with respect to the reference signal and, hence, produce no systematic output signal.

Clearly, the techniques of coherent phase detection cannot be readily implemented in a wireless communication system where the modulation and demodulation processes occur at separate locations that are remotely located from one another, since any attempt to radiate the reference signal, and then separate it from the ambient noise at the receiver would only recreate the initial problem.

It is, accordingly, the object of the present invention to realize the advantages of a coherent phase detector without the need for a coherent reference signal.

SUMMARY OF THE INVENTION

In accordance with the present invention, the equivalent of coherent phase detection is realized by means of a phase diversity detection system which uses two phase detectors and an "almost-coherent" reference signal tuned to the frequency of the signal to be detected. The input signal is divided into two components, each of which is coupled to a different one of the two detectors. Similarly, the reference signal, which is locally generated and not synchronized with the signal to be detected, is also coupled to the detector. Phase diversity is realized by shifting the relative phase of either the input signals or the reference siognals coupled to the two detectors such that either the two input signals or the two reference signals are 90 degrees out of time phase with respect to each other.

In one embodiment of the invention to be described in greater detail hereinbelow, the output signals from the two detectors, which are proportional respectively to the cosine and sine of the phase difference between the input signal and the reference signal, are squared and then summed to produce a direct current output signal.

In a second embodiment of the invention, each of the output signals from the phase detectors is coupled to a mixer along with a second locally generated signal tuned to some arbitrary frequency. The output signals from the two mixers are then summed to produce an output signal at approximately the frequency of the second signal. Advantageously, the second signal frequency is within the audio frequency range to produce an audible tone. Such a system is particularly useful in electronic paging systems such as the Bell Telephone System BELLBOY® paging system.

Recognizing the inherent ability of an almost-coherent phase detector to detect a very weak signal from among many others, closely spaced signals in the presence of noise, a highly secure communications system is proposed.

These and other objects and advantages, the nature of the present invention, and its various features, will appear more fully upon consideration of the various illustrative embodiments now to be described in detail in connection with the accompanying drawings.

DETAILED DESCRIPTION

As indicated above, in many applications it is necessary to identify one signal component from among many other signal components which are both closely spaced in frequency and of comparable or even greater amplitude. The other signal components can be either a continuum of components, such as noise, a plurality of discrete components, such as other useful signals; or a combination of both. For purposes of illustration and discussion, let us consider a system in which a carrier, whose frequency $f_c$ is of the order of $10^9$ hertz, is amplitude modulated by four useful signals $f_1$, $f_2$, $f_3$ and $f_4$, all closely spaced in frequency. As an example, let $$f_1 = 10{,}001 \text{ Hertz}$$

Figure 1:
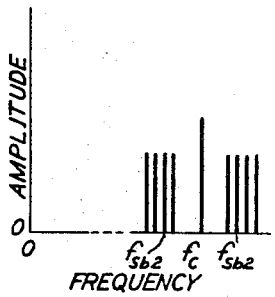
FIG. 1, included for purposes of explanation, shows a carrier signal and four associated pairs of sideband signals.

$f_2 = 10{,}002$ Hertz, $f_3 = 10{,}003$ Hertz and $f_4 = 10{,}004$ Hertz. FIG. 1 shows the carrier $f_c$ and the resulting four pairs of sideband freqeuncies. Let us further specify that one of the signals, corresponding to the second pair of sidebands, $f_{sb_2}$, is to be detected from among the four pairs of sideband frequencies. This is typically the situation in an electronic paging system wherein each of the modulating signals identifies a different subscriber.

Figure 2:
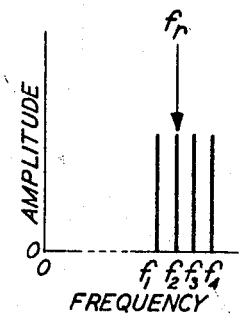
FIG. 2, included for purposes of explanation, shows the four modulating signals after being amplitude detected.

Clearly, radio frequency filters could not be employed, at frequencies of the order of $10^9$ Hertz, to isolate the desired sideband signal components from the two adjacent signal components differing in frequency by as little as only $\pm 1$ Hertz. The first step, therefore, is to amplitude detect the modulating signals. This step recovers the four signal components $f_1$, $f_2$, $f_3$ and $f_4$, as illustrated in FIG. 2. Here again, however, the problem of separating the desired signal $f_2$ from among the other signals that differ in frequency by as little as one part in $10^4$ is still too formidable to be accomplished by means of ordinary filters. It is in such a situation that coherent phase detection is advantageously employed.

Figure 3:
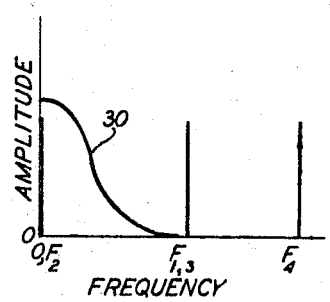
FIG. 3, included for purposes of explanation, shows the four signals of FIG. 2 after coherent phase detection.

In a prior art coherent phase detector, the input signal, comprising the four signal components $f_1$, $f_2$, $f_3$ and $f_4$, is mixed with a reference signal $f_2$. The result is to produce difference beat frequency signal components $F_2$, $F_{1,3}$ and $F_4$ illustrated in FIG. 3. The $F_2$ signal, a D.C. component, is the desired signal. The $F_{1,3}$ and $F_4$ components, differing in frequency by as little as one Hertz, can now be readily separated from the D.C. component by means of R-C filter sections, as indicated by the bandpass curve 30 in FIG. 3.

It is apparent, from the above discussion, that if the reference signal $f_r$ and the desired signal are not tuned to the same frequency, a nonzero difference frequency signal is produced which could easily fall outside the very narrow passband of the R-C filter and be lost. In particular, since the filter passband in the example is of the order of only a fraction of a Hertz, the modulating signal and the reference signal must be tuned within a fraction of a Hertz of each other. This is well within the tolerance limits of presently available oscillators. However, as is also well known, a phase detector operates with a preferred phase relationship between the modulating signal and the reference signal. If this phase difference shifts by 90 degrees, a null is produced in the detector output even though the two signals are tuned to exactly the same frequency. In the prior art coherent phase detector, the proper phase relationship is insured. If, on the other hand, a noncoherent reference signal is employed, as in the present invention, the proper phase relationship is not assured. The two signals can just as readily establish themselves in the null condition, and remain there for an unpredictable period of time since the length of time they remain in any particular phase relationship depends solely upon the random motion of their relative phase. Obviously, any prolonged stay in a null condition would destroy the utility of a noncoherent phase detection system as a receiver of information.

Figure 4:
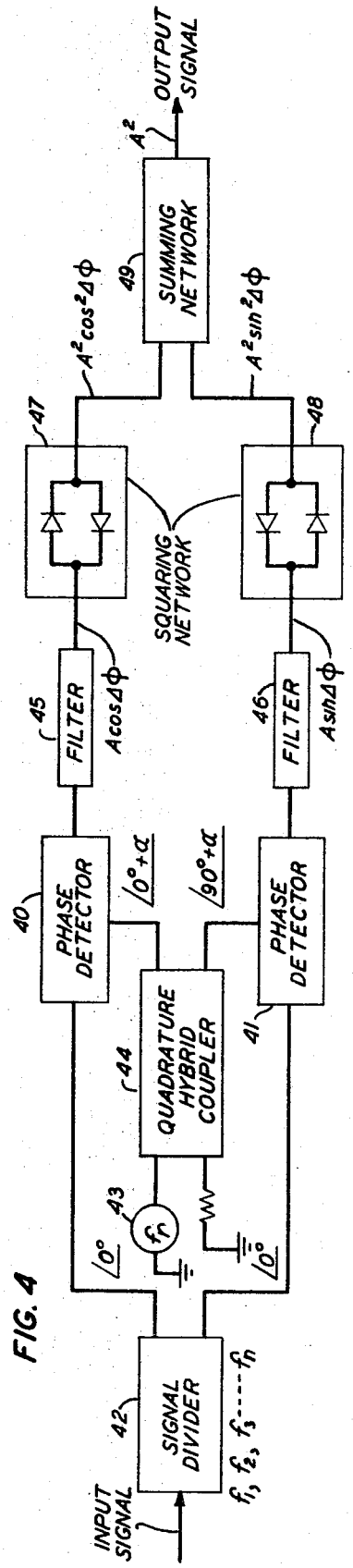
FIG. 4 shows, in block diagram, a first embodiment of an almost-coherent phase detection system.

These several limitations and requirements are totally avoided in the phase diversity, almost-coherent phase detector illustrated in FIG. 4.

In accordance with the present invention, two phases detector 40 and 41 are employed. They can be any one of a variety of phase detectors as shown, for example, in volume 21 of the Massachusetts Institute of Technology, Radiation Laboratory Series, "Electronic Instruments," page 385. The input signal is divided into two two essentially equal portions by means of a signal divider 42 and each of the two signal portions is coupled to a different one of the two detectors. In this particular embodiment the two signal portions are in phase, as indicated by the phase notations $\angle 0°$.

A reference signal, $f_r$, derived from a reference signal source 43, tuned to the frequency of the signal to be detected, is also coupled to both detectors. For reasons to be explained hereinbelow, the two reference signals components are 90 degrees out of time phase, as indicated by the phase notations $\angle 0° + \alpha$ and $\angle 90° + \alpha$ associated with the respective components, where $\alpha$ represents an arbitrary phase difference between the input signal and the noncoherent reference signal. This is conveniently done by coupling the reference signal through a quadrature hybrid coupler 44. Alternatively, an in-phase power divider and a separate phase shifter can be used, or any other convenient means can be employed to obtain the quadrature phase relationship for the reference signals.

The detector outputs are coupled, respectively, to low-pass filters 45 and 46, squaring networks 47 and 48, and then added together in a summing network 49 to produce the output signal.

In operation the input signal, containing the desired signal and one or more additional signals, is divided into two parts which are coupled to the two detectors 40 and 41 along with a noncoherent reference signal, $f_r$, tuned to the desired signal frequency. The two detector output signals, which include a D.C. component and A.C. components, are then passed through low-pass filters 47 and 48 whose passband extends from D.C. to some low frequency which is lower than the frequency of the next adjacent signal.

In a phase detector, the amplitude of the D.C. signal component is a maximum when the input signal and the reference signal are phase-locked. As their relative phase changes, the amplitude of the output signal varies as a function of their phase difference $\Delta \varphi$. In particular, the output $D_1$ is given as $$D_1 = A \cos \Delta \varphi \tag{1}$$

Thus, it is evident that the output from a single phase detector 40, whose reference signal is not phase-locked to the input signal, will tend to vary as the relative phase between the input signal and the reference signal drifts with time. To avoid such fluctuations in the output signal, the reference signal coupled to the second detector 41 is phase-shifted such that it is in time-quadrature with the reference signal coupled to detector 40. So phased, the amplitude $D_2$ of the output signal from detector 41 is given as $$D_2 = A \sin \Delta \varphi \tag{2}$$

As a result of the quadrature relationship between the reference signals, a quadrature relationship also exists between the two phase-detected output signals. Hence, phase drift which tends to cause the magnitude of the output from one of the detectors to decrease, simultaneously causes the magnitude of the output from the other detector to increase.

The two phase-detected output signals are then passed through squaring networks 47 and 48, which can be a pair of parallel-connected, oppositely-poled diodes, to produce signals proportional to $A^2 \cos^2 \Delta \varphi$ and $A^2 \sin^2 \Delta \varphi$. When summed, in summing network 49, a constant-amplitude, D.C. output signal $A^2(\cos^2 \Delta \varphi + \sin^2 \Delta \varphi) = A^2$ is obtained.

Figure 5:
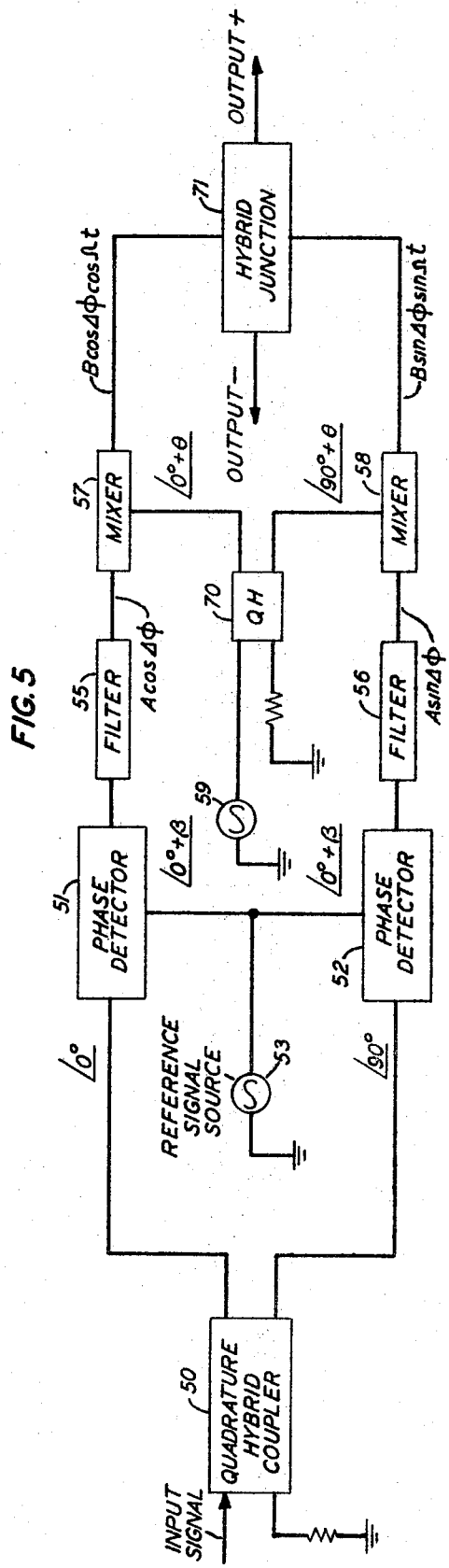
FIG. 5 shows a second embodiment of the invention for producing an audible output tone.

In an electronic paging system such as the Bell System BELLBOY®, some sort of audible indication is generated to notify the subscriber that he is being called. FIG. 5 shows a second embodiment of the invention adapted to produce such an audible tone instead of a D.C. output signal. In this embodiment, as in the embodiment of FIG. 4, the input signal is divided into two components. Each component is coupled to a phase detector 51 or 52, along with a reference signal derived from a reference signal source 53.

It will be noted that in this embodiment a quadrature hybrid coupler 50 is used to divide the input signal As a result, the two signal components are shown as being in time-quadrature while the reference signals are in time-phase. The purpose of this variation is merely to illustrate that, in general, either the input signals or the reference signals can be in time-quadrature.

Following phase-detection, the signals are passed through low-pass filters 55 and 56 to produce the two sub-audible signals $A \cos \Delta\varphi$ and $A \sin \Delta\varphi$.

To produce an audible output, signals $A \cos \Delta\varphi$ and $A \sin \Delta\varphi$ are coupled to signal mixers 57 and 58, respectively, along with a locally generated signal in the audible frequency range. The latter, derived from a local oscillator 59, is coupled through a quadrature hybrid coupler 70 to produce a quadrature phase relationship between the local oscillator signals coupled to the two mixers.

The output from mixers 57 and 58, being proportional to the product of the two input signals, are of the form $B \cos \Delta\varphi \cos \Omega t$ and $B \sin \Delta\varphi \sin \Omega t$, where $\Omega$ is the angular frequency of the signal derived from local oscillator 59. These two signals are then added together to produce the output signal. In the embodiment of FIG. 5, the signals are combined in a 180 degree hybrid junction 71 to produce sum and difference signals. The sum signal, indicated as "Output +," is $$C \cos \Delta\varphi \cos \Omega t + C \sin \Delta\varphi \sin \Omega t = C \cos (\Omega t + \Delta\varphi)$$

The difference signal, indicated as "Output —," is $$C \cos \Delta\varphi \cos \Omega t - C \sin \Delta\varphi \sin \Omega t = C \cos (\Omega t - \Delta\varphi)$$

Since $\Delta\varphi$ is less than one hertz and, hence, much less than $\Omega$, the output from either branch of junction 71 is a constant amplitude signal whose tone is, for all practical purposes, defined by the frequency of local oscillator 59. In addition, the output signal is linearly proportional to the input signal in distinction to the previously described detection system wherein the output signal is proportional to the square of the input signal. A linear variation is generally more desirable if the amplitude of the input signal tends to have a significant variation in range.

Figure 6:
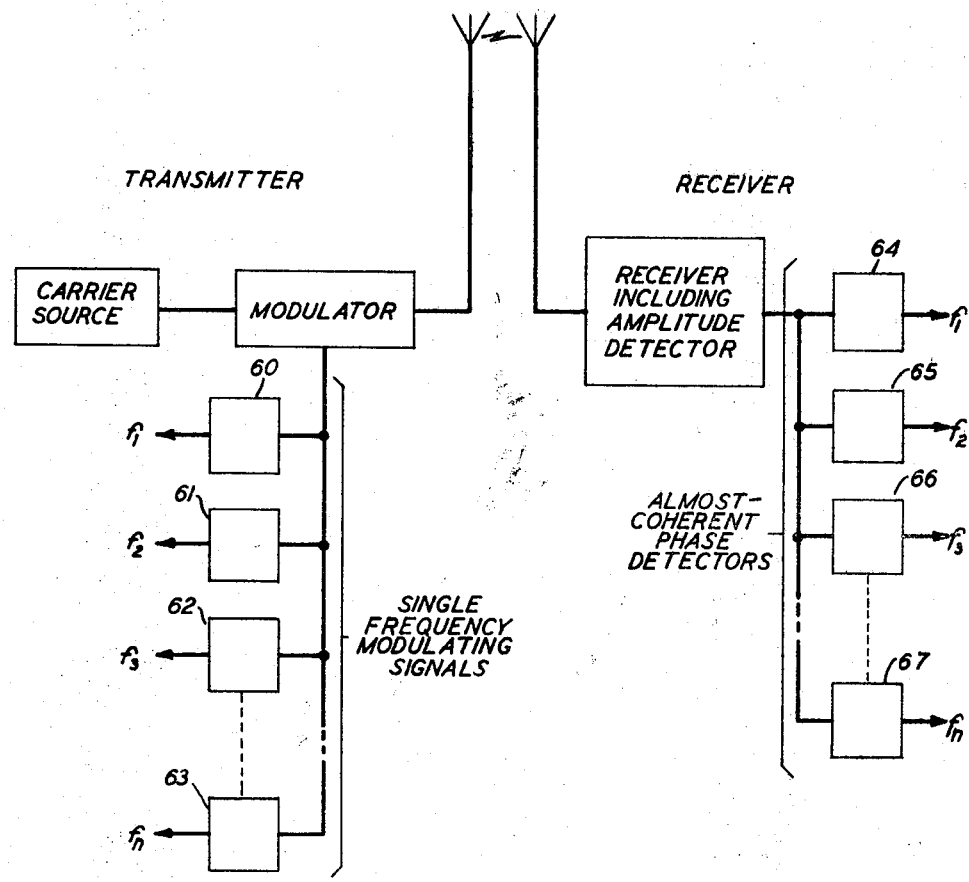
FIG. 6 shows the use of noncoherent phase detectors in a secure communication system.

In the discussion hereinabove, the carrier frequency and the several sideband frequencies were known to the intended recipient. A third party, without any knowledge of either the carrier frequency or the modulating frequencies, could, by means of standard search techniques, intercept the carrier signal, ascertain its frequency and locate its point of origin. However, he would be totally unable to separate and identify the very closely spaced individual modulating signals. Thus, an almost-coherent phase detector, in accordance with the present invention, makes possible a highly secure communications system. In such a system, illustrated in FIG. 6, the carrier is modulated by one or more of a plurality of modulating signals $f_1, f_2, f_3 \ldots f_n$, closely spaced in frequency.

The intelligence to be conveyed is contained in the particular combination of modulating signals employed. At the receiver, a plurality of almost-coherent phase detectors, each tuned to detect one of the plurality of possible modulating signals, is provided. To insure that the reference signals for each of the phase detectors is tuned as closely as possible to the same frequency as the modulating signals, both the modulating signal sources 60, 61, 62 and 63, and the reference signal sources associated with each phase detector 64, 65, 66 and 67 are, advantageously, crystal-controlled signal sources of the type described in my copending application Ser. No. 690,507, filed Dec. 14, 1967, and now U.S. Pat. No. 3,462,703. As disclosed in that application, oscillators having a stability of the order of one part in $10^6$ or better can be realized. Thus, if the modulating signals are in the audio range of about 1000 hertz, the modulating signals can be spaced apart as little as 0.001 hertz (i.e., $f_1=1000.001$, $f_2=1000.002$, $f_3=1000.003 \ldots f_n=1000+(.001)n$ hertz). To detect these signals, the passband $\Delta f$ of the low-pass filters in the phase detectors would be of the order of less than .001 hertz. This would then require that the carrier signal be transmitted for a period of time $\tau$ given approximately by $$\tau > \frac{1}{3.5\Delta f}$$

Since $\Delta f=.001$, $\tau$ would be equal to approximately 300 sec., or about five minutes.

Security may also demand not only that the information conveyed be denied to unauthorized recipients, but also that the very existence of the signal be kept secret. For example, if the transmitter is located in hostile territory where it could be located and destroyed, it would be advantageous that its location not be revealed. Yet, on the other hand, it has just been shown hereinabove that to phase detect the signals, in accordance with the present invention, the carrier must be on the air approximately five minutes. These seemingly conflicting requirements can be satisfied when it is realized that an almost-coherent phase detector is an extremely narrow band device and, hence, is capable of detecting a signal in the presence of high level noise. If, therefore, the signal is totally submerged in the inherent noise of the receiver, the unauthorized recipient can be made totally ignorant of the very existence of the carrier as well as being denied access to the intelligence being conveyed. Thus, maximum security can be realized by deliberately masking the signal in noise. This is accomplished by deliberately transmitting a very weak signal and utilizing the very significant ability of an almost-coherent phase detector to detect a signal in the presence of noise.

In all cases it is to be understood that the above-described arrangements are illustrative of a small number of the many possible specific embodiments which can represent applications of the principles of the invention. Numerous and varied other arrangements can readily be devised in accordance with these principlees by those skilled in the art without departing from the spirit and scope of the invention.

I claim:

1. An almost-coherent phase detection system comprising:
   first and second phase detectors;
   means for coupling to each of said phase detectors a portion of an input signal containing a desired signal component to be detected and at least one other signal component at another frequency;
   a noncoherent reference signal source tuned to the frequency of the signal component to be detected;
   means for coupling said reference signal source to each of said detectors;
   characterized in that:
   said means for coupling said input signal and said means for coupling said reference signal introduce an additional 90 degree phase shift between the reference signal and the desired signal component in the first and said detectors relative to the phase angle between the reference signal and the desired signal component in the second of said detectors;
   and nonlinear means for combining the phase-detected signals derived from said phased detectors.

2. The system according to claim 1 wherein the reference signals coupled to said phase detectors are 90 degrees out of phase.

3. The system according to claim 1 wherein the two portions of the signal component to be detected are coupled to said phase detectors 90 degrees out of phase.

4. An almost-coherent phase detection system comprising:
   first and second phase detectors;
   means for coupling to each of said phase detectors a portion of an input signal which includes a desired signal component to be detected and wave energy at other frequencies;

means for simultaneously coupling to each of said detectors a noncoherent reference signal, nominally tuned to the frequency of said signal component such that an additional 90 degree phase shift is introduced between the reference signal and the desired signal component in the first of said detectors relative to te phase angle between the reference signal and the desired signal component in the second of said detectors;

a squaring circuit coupled to each detector for generating a signal proportional to the square of the signal derived from each of said detectors; and means for adding the signals from said squaring circuit to produce an essentially direct current output signal.

5. An almost-coherent phase detection system comprising:

first and second phase detectors;

means for coupling to each of said phase detectors a portion of an input signal containing a desired signal component to be detected and at least one other signal component at another frequency;

a noncoherent reference signal source nominally tuned to the frequency of the signal component to be detected;

means for coupling said reference signal source to each of said detectors such that an additional 90 degree phase shift is introduced between the reference signal and the desired signal component in the first of said detectors relative to the phase angle between the reference signal and the desired signal component in the second of said detectors;

a pair of mixers;

a local oscillator;

means for coupling the output of each phase detector to a different one of said pair of mixers;

means for coupling signals from said local oscillator to each of said mixers in time quadrature; and means for combining the output signal from said mixers to produce an output signal at substantially the frequency of said local oscillator.

6. The phase detector according to claim 5 wherein the frequency of said local oscillator lies within the audio range.

7. A secure communication system including a transmitter and a receiver;

said transmitter comprising a carrier generator, a modulator and a plurality of single-frequency signal sources;

means for coupling said generator to said modulator; and means for selectively coupling said single-frequency sources to said modulator to amplitude modulate said carrier;

said receiver including an amplitude detector, a plurality of pairs of phase detectors equal to the number of single-frequency sources, and an equal plurality of noncoherent reference signal sources each of which is nominally tuned to the same frequency as one of said single-frequency signal sources;

means for coupling said amplitude detector to each of said phase detectors;

means for coupling the signal from each of said reference sources to a different pair of phase detectors such that the reference signal coupled to one detector of each pair of detectors is in time-quadrature with the corresponding reference signal coupled to the other detector of each pair of detectors; and means for combining the outputs from each of said pairs of detectors to produce output signals indicative of the presence of one or more of said single-frequency signals.

References Cited

UNITED STATES PATENTS

| | | | |
|---|---|---|---|
| 2,494,323 | 1/1950 | Weber | 325—472 |
| 2,857,457 | 10/1958 | Richman. | |
| 3,070,747 | 12/1962 | Addleman | 325—476 |
| 3,353,147 | 11/1967 | Meeker | 325—473 |
| 3,456,195 | 7/1969 | Fulton. | |

RICHARD MURRAY, Primary Examiner

J. A. BRODSKY, Assistant Examiner

U.S. Cl. X.R.

179—15; 325—472, 476, 487; 329—112